United States Patent [19]

Lejeune

[11] 3,866,653
[45] Feb. 18, 1975

[54] FLAPS FOR TIRES
[75] Inventor: Daniel Lejeune, Clermont-Ferrand, France
[73] Assignee: Compagnie Generale des Etablissements Michelin raison sociale Michelin & Cil, Clermont-Ferrand, France
[22] Filed: Mar. 23, 1973
[21] Appl. No.: 344,424

[30] Foreign Application Priority Data
Mar. 31, 1972 France .............................. 72.11709

[52] U.S. Cl.................. 152/365, 152/371, 152/204
[51] Int. Cl. .......................................... B60c 21/04
[58] Field of Search ........... 152/203, 204, 349, 350, 152/365, 366, 371

[56] References Cited
UNITED STATES PATENTS
| 1,505,910 | 8/1924 | Michelin | 152/365 |
| 1,534,686 | 4/1925 | Colgan | 152/366 |
| 1,939,095 | 12/1933 | Balfe | 152/366 |
| 2,773,535 | 12/1956 | Tolonen | 152/365 |

Primary Examiner—Drayton E. Hoffman
Attorney, Agent, or Firm—Brumbaugh, Graves, Donohue & Raymond

[57] ABSTRACT

Improved flaps for tires have a reinforcement in the region of the increased thickness of material around the valve hole and the reinforcement comprises a rigid tubular insert within the valve hole and a layer of reinforced elastomer which forms a covering of the radially inner surface of the flap all around the insert.

3 Claims, 5 Drawing Figures

PATENTED FEB 18 1975 3,866,653

FLAPS FOR TIRES

The present invention relates to improvements in flaps for tires, which improvements are applicable in particular, but not exclusively, to molded rubber flaps of the ethylene-propylene-terpolymer elastomer type.

Tires used with an inner tube above a certain size require the use of a flap. As is known, a flap is a protective ring which is interposed between, on the one side, the inner tube and, on the other side, the rim and the beads of the tire fastened to the rim. The flap avoids pinching of the inner tube between the rim and the beads and protects it from contact with or rubbing against the rim which may be brought to a high temperature by the operation of the brakes.

A recent improvement in the manufacture of flaps which has been described in French Pat. No. 1,529,591 consisted in manufacturing very thin flaps by molding, using a rubber of the ethylene-propylene-terpolymer elastomer type. In this way one obtains with great economy light flaps which have excellent resistance to heat and snugly fit the shape of the beads of the tire due to their deformability.

The known flaps, including those described in the aforementioned patent, however, have one drawback. Under the influence on the one hand of the heat coming from the brakes and transmitted by the rim, and on the other hand of the pressure exerted by the inner tube, the rubber material of the flap flows into the valve hole, i.e., the hole in the flap for the passage therethrough of the valve stem for the inner tube. A local thinning of the flap thus takes place which may go so far as to result in its perforation. Furthermore, the rubber material which has flowed into the valve hole gradually fills up this opening and extends along the rim bottom, finally pushing the valve stem and causing it to rub against the brake drum.

The object of the present invention is to avoid these drawbacks without producing other drawbacks, and in particular without preventing the inner tube from being applied against the flap, even all around the valve hole.

The tire flap in accordance with the object of the present invention has an increased thickness of material around the valve hole and a reinforcement in that region and is characterized by the fact that said reinforcement is constituted, on the one hand, of a rigid tubular insert which forms the wall of the valve hole through the flap, except in the vicinity of the radially outer surface of the flap, and, on the other hand, of a layer of reinforced elastomer which forms a covering of the radially inner surface of the flap all around the insert.

In accordance with a preferred embodiment, the insert is formed of a tubular portion and of two small collars, one of which is intended to be embedded in the thickness of the flap near its radially outer surface and the other to cover the layer of reinforced elastomer so as to form the radially inner surface of the flap all around the valve hole. In this case, the height of the insert is obviously less than the thickness of the flap.

It is essential that the insert is not flush with the radially outer surface of the flap and that it is covered on this side by a layer of rubber if one desires to prevent the insert from resting directly against the metal foot of the valve in contact with the inner tube and accordingly not keep the latter spaced from the flap.

It is preferable that one of the collars of the insert form the radially inner surface of the flap all around the valve hole and apply itself against the rim.

The invention will be fully understood by means of an embodiment which will now be described with reference to the accompanying drawings.

Figure 1:
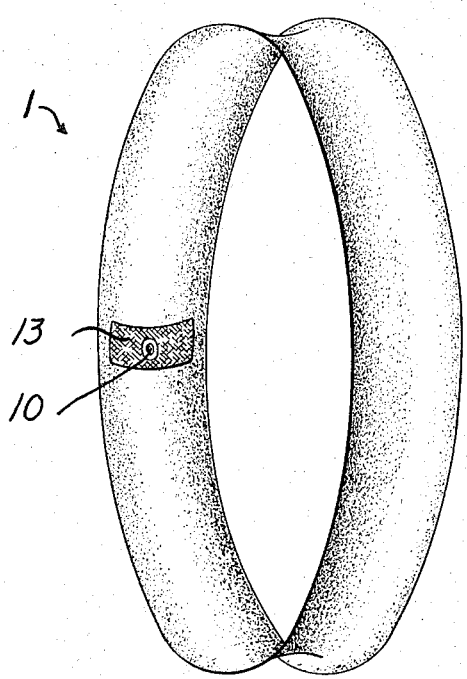
FIG. 1 is a perspective view of a flap in accordance with the invention.
Figure 2:
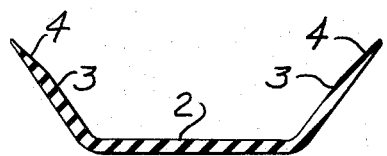
FIG. 2 is a cross-sectional view through the flap outside of the region of the valve hole.
Figure 3:
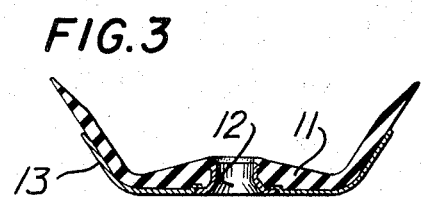
FIG. 3 is a cross-sectional view through the flap taken through the axis of the valve hole.

The flap 1 shown in FIG. 1 is of annular shape with a trough-shaped cross-section as shown in FIG. 2. It has a bottom 2 and two wings 3 whose edges 4 are progressively thinned. The flap 1 furthermore has a valve hole 10. As shown in FIG. 3, in the vicinity of the valve hole 10, the flap has three elements, namely an increased thickness 11, an insert 12 and a reinforcement formed of a rubberized cloth 13.

Figure 5:
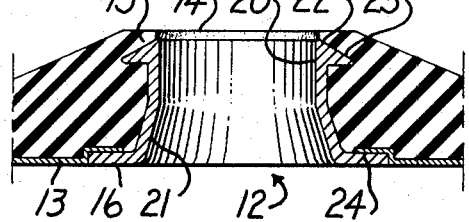
FIG. 5 is an enlarged cross-sectional view of the insert around the valve hole.
Figure 4:
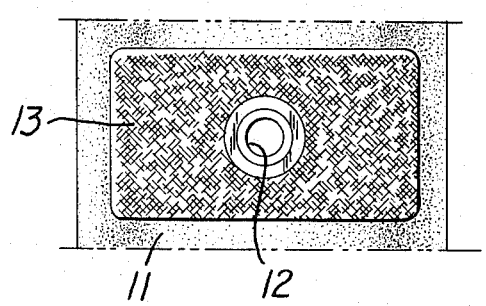
FIG. 4 is a plan view of the radially inner surface of the flap in the vicinity of the valve hole.

The insert 12 is shown in enlarged cross-section in FIG. 5. It comprises a tube which is cylindrical in its first half 20 and frustoconical in its second half 21 so as to facilitate the passage therethrough of the valve stem (not shown). The cylindrical portion 20 terminates in a relatively thick collar 22 having a tapered surface 23. The frustoconical portion 21 terminates in a flat, relatively wide collar 24. As can be noted from FIG. 3, the collar 22 is embedded in the portion of increased thickness 11 of the flap and is separated from the radially outer surface 14 by a layer 15 of elastomer. On the other hand, the collar 24 around the valve hole 10 forms the radially inner surface 16 of the flap which is intended to come in contact with the rim. Between the flap 1 and the collar 24 of the insert 12, a strip of rubberized cloth 13 is interposed. FIGS. 1 and 4 show that this strip 13 is arranged transversely and has an approximately rectangular shape. The strip 13 is glued onto the radially inner surface 16 of the flap; it extends over the entire width of the flap, except for the thinned edges 4, and it is impregnated with a rubber which deforms only slightly under heat and therefore is not very sensitive to flow.

The manufacture of a flap such as the one shown is effected in three steps. In a first step, the flap 1 itself is produced by molding. In a second step, the strip of rubberized cloth 13 is applied at the same time as the insert 12 is introduced by the exertion of force. In a third step, the area adjacent the valve hole 10 is heated under localized pressure to vulcanize the rubberized cloth 13 and cause it to adhere to the radially inner surface 16 of the flap and at the same time to cause the increased thickness 11 to flow all around the insert 12.

The layer of rubber 15 which covers the collar 22 of the insert thus forms a flexible cushion which does not prevent contact of the inner tube with the flap, even when the valve of the inner tube has a metal collar. This would not be the case if the collar 22 were flush with the radially outer surface 14 of the flap.

On the other hand, the collar 24 is intended, like the rubberized cloth 13, to come directly into contact with the rim, without the interposition of a rubber cushion which can flow during operation.

The insert 12 may be of any suitable material, and in particular of metal, for instance brass or an aluminum alloy, or else of a plastic which is capable of withstanding a high temperature.

The insert 12 not only prevents the rubber material of the flap from flowing into the valve hole 10, but in addition it permits precise positioning of the valve stem with respect to the bottom of the rim and prevents displacement of the valve stem in the direction towards the brake drum.

What is claimed is:

1. In a tire flap having an increased thickness of material around the valve hole and a reinforcement in that region, the improvement which comprises said reinforcement being constituted of
   a. a rigid tubular insert which forms the wall of the valve hole through the flap, except in the vicinity of the radially outer surface of the flap, said tubular insert having two collars, the first collar being embedded in the increased thickness of the flap and spaced from the radially outer surface of the flap and the second collar forming the radially inner surface of the flap around the valve hole, and
   b. a layer of reinforced elastomer which forms a covering of the radially inner surface of the flap all around the insert, said layer being formed of a rubberized cloth glued to the flap and interposed between the flap itself and the second collar.

2. The flap defined by claim 1 wherein the tubular insert is cylindrical toward the radially outer surface of the flap and is frustoconical toward the radially inner surface of the flap.

3. The flap defined by claim 1 wherein the first collar of the insert has a tapered surface to facilitate the embodiment of the insert into the flap.

* * * * *